July 20, 1965  R. N. JACKSON  3,195,512
APPARATUS FOR WATERING POULTRY
Filed April 8, 1963  2 Sheets-Sheet 1
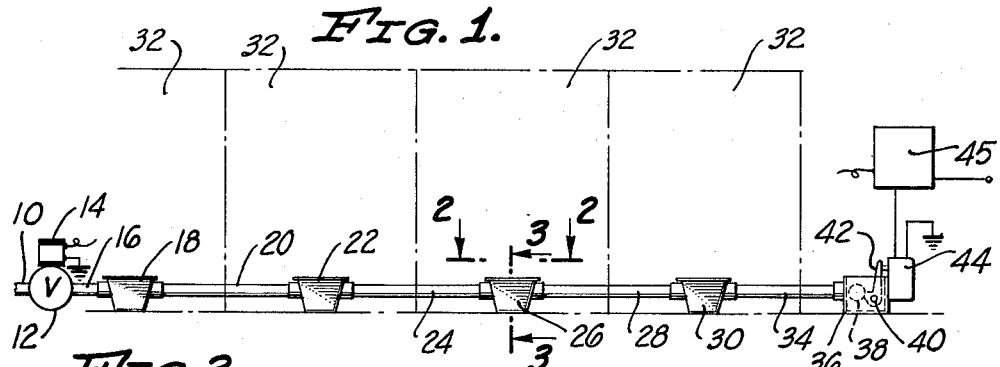
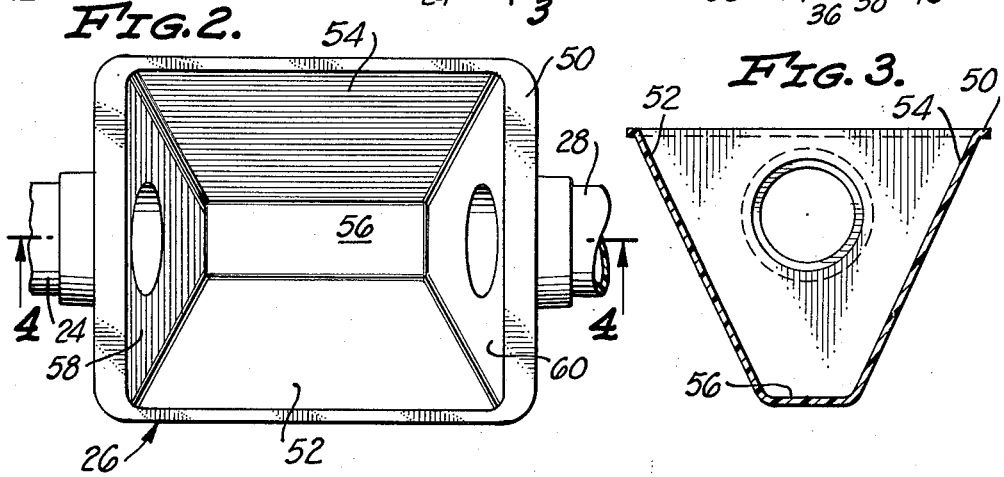
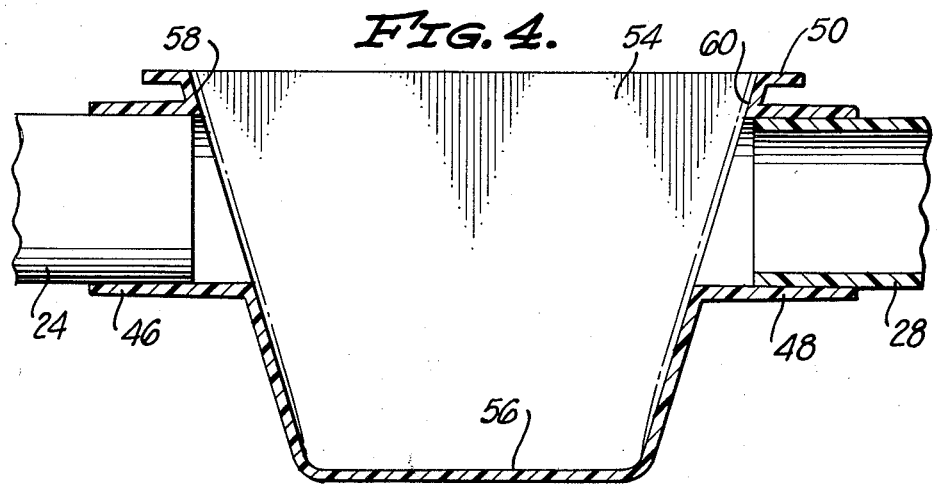
INVENTOR.
ROBERT N. JACKSON
BY
EDWARD D. O'BRIAN
ATTORNEY

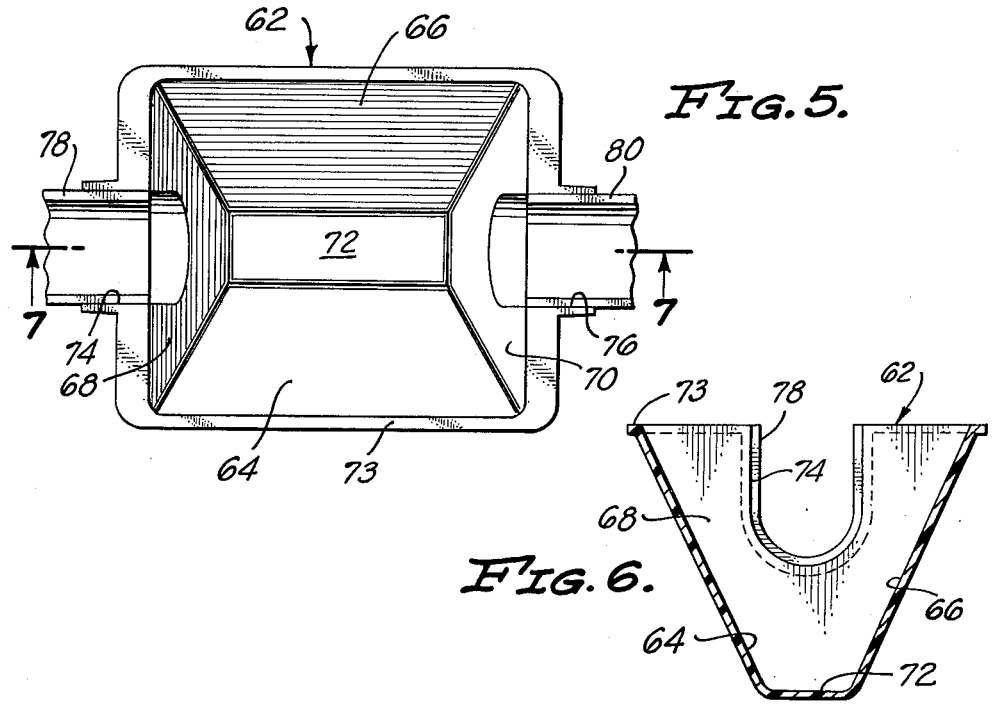
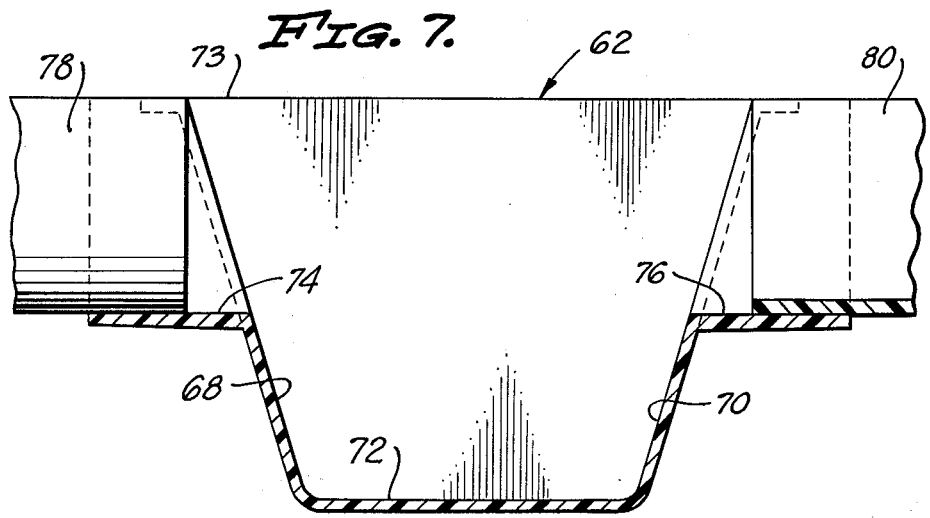

United States Patent Office 3,195,512
Patented July 20, 1965

3,195,512
APPARATUS FOR WATERING POULTRY
Robert N. Jackson, 7532 Red Gum Road,
Anaheim, Calif.
Filed Apr. 8, 1963, Ser. No. 271,080
3 Claims. (Cl. 119—78)

This invention relates to an improved apparatus for watering poultry.

Prior poultry watering devices are well known, but each device has disadvantages. Prior devices normally maintain a fixed water level in a poultry watering trough. This fixed level of water rapidly develops algae and scum due to the fact that poultry inadvertently deposit food material into the water in the watering device. Due to the presence of algae and fungus forming materials, and this medium of food materials dissolved in the water, it is common to find various kinds of fungi and algae growing in poultry watering devices. This provides an unhealthy situation for the birds which are normally sensitive to the various fungal infections. Such constant level watering devices must be manually cleaned at very regular, close intervals to protect the health of the birds. Another disadvantage of the prior type of constant level watering devices is that the valves controlling the water level have a tendency to become unable to control water flow, for hardness materials in the water deposit on the seat and disc of the valve and prevent the disc from properly seating. Water flow then becomes constant, independent of water level and over-flowing occurs. The litter in the poultry house then becomes wet and creates an unhealthy condition for the poultry therein. Such situations tend to cause pneumonia among the birds.

Accordingly, it is an object of this invention to provide a poultry watering apparatus which is of such nature that algae and fungus do not have an opportunity to form in a bath of water.

It is another object of this invention to provide apparatus that is independent of the difficulties of scale formation upon the seat of a float operated valve.

It is another object of this invention to water poultry in such a manner that their environment is not prejudiced.

It is another object of this invention to provide a poultry watering apparatus which is economic of structure so that it can be purchased and installed at minimum investment and designed in such a manner that little maintenance is required to maintain a healthy environment for the poultry.

Other advantage and benefits of this invention will become readily apparent upon study of the appended specification and drawings in which:

FIGURE 1 shows a general side elevational view of the equipment of this invention;

FIGURE 2 shows an enlarged top plan view of one of the individual watering devices shown in FIGURE 1, taken along line 2—2 of FIGURE 1;

FIGURE 3 shows an enlarged vertical section through the individual watering device taken along the line 3—3 of FIGURE 1;

FIGURE 4 shows an enlarged vertical section through the watering device taken along the line 4—4 of FIGURE 2;

FIGURE 5 is an enlarged plan view of another species of the individual watering devices shown in FIGURE 1;

FIGURE 6 is a transverse cross-section through one of the watering devices of FIGURE 5, taken along the section line similar to the section of FIGURE 3; and FIGURE 7 is a vertical section through the watering device taken along the lines 7—7 of FIGURE 5.

Referring now to the drawings, the general elevation of FIGURE 1 shows the equipment which comprises an inlet water pipe 10 supplying water under pressure to valve 12 which is operated by solenoid 14. Connected to the outlet of valve 12 is a conduit 16 which supplies water to a poultry watering cup 18. A series of watering cups 18 are connected together. To accomplish this a conduit 20 is connected to watering cup 18 and to another identical watering cup 22. This series is repeated with conduit 24 and watering cup 26 and is again repeated with conduit 28 and watering cup 30.

It is obvious the number of watering cups can be repeated in series for as many watering cups as are needed. One watering cup is located in each cage 32 so that the number of watering cups is dependent upon the number of cages 32. The last cup 30 has a terminal conduit 34 which is connected to a basin 36.

Basin 36 contains a float 38 mounted on pivot 40. The float 38 carries an upstanding arm 42 positioned to actuate a suitable electric switch 44. The electric switch 44 is serially connected to the solenoid 14, to time clock 45, and to a supply of electric current in a conventional manner. The cups 18, 22, 26 and 30, as well as the connecting conduits 16, 20, 24, 28 and the terminal conduit 34 are arranged in a substantially level or slightly downhill manner in the right-hand direction as viewed in FIGURE 1.

In operation the time clock periodically closes an electric contact furnishing electricity to the solenoid valve 14, thereby opening valve 12 to supply water from inlet water pipe 10 to the conduit 16. Switch 44 is in series with this circuit and is closed until the float 38 signals water level in basin 36. Water flows through conduit 16 into the cup 18 until the level reaches the level of conduit 20. Thence water flows into cup 22 until the water level in cup 22 reaches the outlet level of conduit 24. Thence cups 26 and 30 fill to the level of their outlet water conduits in similar manner, and water flows through the terminal conduit 34 into basin 36. When the water level in basin 36 rises to raise float 38, switch 44 is actuated by upstanding arm 42 thereby de-energizing solenoid 14 and closing valve 12. A short while thereafter the time clock also de-energizes the power circuit. The frequency of operation of the time clock is dependent on the size of the cups 22 and the number and thirst of the poultry drinking out of each one of the watering cups. The timing is best determined experimentally.

The poultry drink from cups 18, 22, 26 and 30 and since there is no continued water supply, the water level therein goes down. As the water goes down the poultry drink deeper into the cups and scrape the sides thereof with their beaks. This effectively cleans the sides of any accumulated algae and food particles. As the poultry drink from the cups until they are empty, the entire interior of the cups is cleaned. The particular shape of the cups is such that it permits effective contact by the beaks of the poultry.

As poultry drink from the last cup 30, water flows in the reverse direction through terminal conduit 34 so that the water level in the basin fluctuates in level between the height established by the bottom of terminal conduit 34 and at the point where float 38 opens the contacts of switch 44. The float is set in such a manner that the contacts are closed when the water level in basin 36 is at the bottom of terminal conduit 34 and are opened when the water level is somewhat above that level. Thus, as water flows into basin 36 the contacts of switch 34 are opened to close valve 12 and when poultry drink from cup 30, the water level in basin 36 is lowered sufficiently to permit opening of valve 12 the next time clock 45 closes its contacts.

Referring now to FIGURES 2, 3 and 4, the poultry watering cup 26 is seen therein. Each of the cups is identical and can be made of metal or of plastic. Injection moulded plastic furnishes the most economic method of manufacture. A plastic material which is rigid enough for this service without being brittle, and which does not support fungal action, is considered to be preferable. Conduit 24 is also preferably of plastic. The inlet conduit 24 is secured in an inlet boss 46. The joint may be made by a suitable adhesive or by any other suitable sealing joint such as O ring seals or screw joints. The outlet conduit 28 is similarly secured in an outlet boss 48. The cup itself includes a top flange 50 and depending from the top flange 50 are front and back walls 52 and 54. These walls slope toward each other so that the bottom of the cup is a shorter distance from front to back than at the top flange 50. The bottom 56 of the watering cup 26 is joined to the front and back walls 52 and 54 by smooth curves to prevent any sharp corners in which algae or food may accumulate. Similarly left wall 58 and right wall 60 depend from the top flange 50 and slope toward each other as they descend into the bottom of the watering cup and join the bottom 56 in smooth curves. The left wall 58 carries the inlet boss 46 and right wall 60 carries the outlet boss 48. The juncture between the front and back walls 52 and 54 and the left and right walls 58 and 60 and the juncture between the left and right walls 58 and 60 and the bottom 56, are in the form of smooth curves for the reason hereinbefore recited.

FIGURES 5, 6 and 7 show another form of the cups 18, 22, 26 and 30. In this form, the cups are connected by a different form of conduit hereinbefore referred to as 16, 20, 24, 28 and 34. Referring now to FIGURES 5 through 7, the poultry watering cup 62 has sloping front and rear walls 64 and 66, and sloping left and right walls 68 and 70, respectively. It also has a bottom 72. The walls and the bottom are connected together, as has been hereinbefore described with respect to poultry watering cup 26, with smooth curves to prevent any sharp corners in which algae or food may accumulate.

A top flange 73 is connected to each of the four walls. As contrasted to the earlier described embodiment, the poultry watering cup of this embodiment has U-shaped, open top flanges at the inlet boss 74 and outlet boss 76. The U-shaped conduits 78 and 80 are inserted in the bosses 74 and 76 for the conductance of water into the poultry watering cup 62 and for the conductance of water out of the cup 62 into the next successive poultry watering cup. The conduits 78 and 80, as well as the associated bosses in which they are attached, have open tops. These open tops make the entire conduit accessible to the poultry so that the action of their beaks while they are drinking water, continuously cleans not only the poultry watering cup itself, but the conduits that supply water through the system. Accordingly, this embodiment is even a further advance in the prevention of growth of algae and fungus. The poultry watering cup 62 of FIGURES 5 through 7 is connected into a system such as is shown in FIGURE 1, by means of the open top conduits 78 and 80. Such a system has the identical function to the system described in FIGURE 1, with the additional advantage that the conduits themselves may be cleaned by the poultry.

Having particularly pointed out the preferred embodiment of this invention, it is seen to those skilled in the art as being capable of numerous embodiments within the range of conventional engineering and therefore it is desired that the scope of the invention be defined by the appended claims.

I claim:

1. In apparatus for watering poultry, water supply means, electric shut-off valve means connected to said water supply, a plurality of poultry watering cups, each of said poultry watering cups having a bottom, a plurality of conduits, each of said conduits having a bottom and each of said conduits being connected to adjacent watering cups so as to connect said plurality of poultry watering cups into a series having a first poultry watering cup and a last poultry watering cup, said bottom of each of said plurality of serially connected poultry watering cups being below the bottom of said conduit where it is connected to each of said poultry watering cups, said first serially connected poultry watering cup being connected to said valve means so as to be adapted to receive water therefrom, said last of said serially connected poultry watering cups being connected to water level detection apparatus, said water level detection apparatus being electrically connected to a time clock and to said electric valve means so that actuation of the valve means by said time clock permits water to fill each of said poultry watering cups to a predetermined level whereupon said water level sensing apparatus closes the water supply valve.

2. The apparatus of claim 1 wherein said poultry watering cups have inwardly sloping sides joined by rounded corners so that the action of poultry drinking water therefrom effectively cleans said watering cups.

3. The apparatus of claim 2 wherein said conduits have an open top, the open top of said conduits being of sufficient size to permit access of poultry thereto to effectively clean said conduits.

References Cited by the Examiner
UNITED STATES PATENTS

| | | | |
|---|---|---|---|
| 2,921,556 | 1/60 | Nilsen | 119—80 |
| 3,023,770 | 3/62 | Godshalk | 119—74 |
| 3,086,500 | 4/63 | Spire | 119—78 |

SAMUEL KOREN, *Primary Examiner.*

HUGH R. CHAMBLEE, *Examiner.*